United States Patent [19]

Pressley

[11] Patent Number: 4,611,445
[45] Date of Patent: Sep. 16, 1986

[54] SAG-RESISTANT CEILING PANEL

[75] Inventor: James O. Pressley, Millersville, Pa.

[73] Assignee: Armstrong World Industries, Inc., Lancaster, Pa.

[21] Appl. No.: 679,496

[22] Filed: Dec. 7, 1984

[51] Int. Cl.$^4$ .............................................. E04B 1/88
[52] U.S. Cl. ........................................ 52/144; 264/119
[58] Field of Search ............... 264/119; 428/302, 446, 428/689; 52/484, 612, 309.4, 144, 145; 106/84, 85

[56] References Cited

U.S. PATENT DOCUMENTS

| 2,797,201 | 6/1957 | Veatch et al. | 52/612 |
| 3,220,915 | 11/1965 | Shannon | 52/484 |
| 4,183,886 | 1/1980 | Garrick | 264/119 |
| 4,264,671 | 4/1981 | Oita et al. | 428/302 |

Primary Examiner—James L. Ridgill, Jr.

[57] ABSTRACT

A ceiling panel resistant to sag when exposed to a fire in a room comprising mineral wool fibers and lithium carbonate, or the fused decomposition product thereof.

6 Claims, 1 Drawing Figure

FIGURE
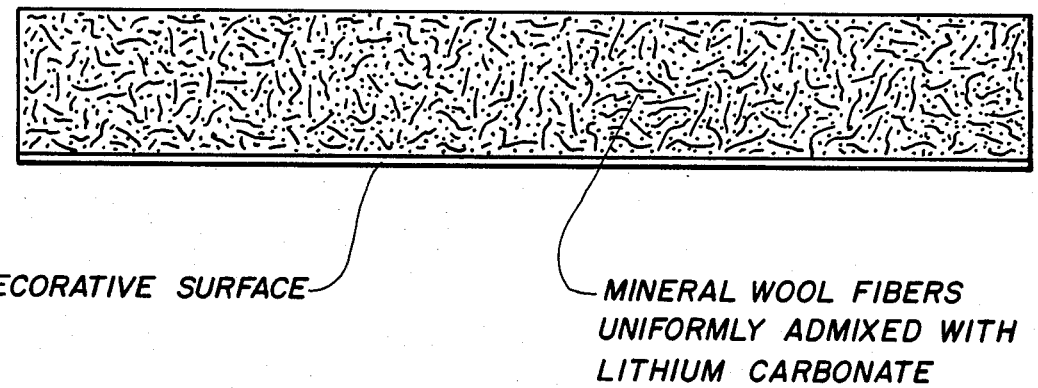

4,611,445

SAG-RESISTANT CEILING PANEL

BACKGROUND OF THE INVENTION

Ceiling panels, particularly acoustical ceiling panels, are often made from a loose mass of slightly compacted mineral wool fibers. The low density characteristics of these panels are needed to obtain desirable acoustical qualities. Yet the nature of mineral wool is such that it loses strength and deforms when exposed to temperatures beginning at about 700° C. such as are encountered when a fire breaks out in a room containing mineral wool acoustical ceiling panels. Deformation of the entire panel occurs when the individual mineral wool fibers shrink under viscous flow and allow the panel to fall from the ceiling. This dropping of the ceiling panels during a fire exposes the plenum and the under surface of the structure above the room to the fire conditions. Thus, the spread of the fire is enhanced.

Accordingly, it is desirable to make a panel of mineral wool fibers which preserves the needed acoustical properties and yet which sufficiently withstands predictable fire conditions to delay the fall of the panel from the ceiling and thus to retard the early spread of the fire. At the same time, the acoustical ceiling panel must withstand the normal ambient conditions to which all acoustical ceiling panels are exposed during use. Any treatment of the mineral wool fibers must be such that when exposed to the normal moisture and air in a room, the treating system does not stain the ceiling, become too acid or too basic and thus destroy the fibers, and not release any objectionable odors during the normal life of the panel, or release noxious gases during the fire. It is the primary object of the present invention to present a panel which meets these requirements.

THE PRIOR ART

A series of prior patents has faced the problem of fire-resistant ceiling panels which may or may not be acoustical. Most of these prior patents use a variety of different means to cope with the problems. Some use coated refractory fibers, others use a mixture of crystalline fibers with vitreous fibers, some teach refractory deposits on the surface of vitreous fibers, and some use ceramic fibers. U.S. Pat. No. 3,348,994-Rees et al. teaches the use of glass fibers which have been treated with a devitrifying agent along with a devitrifying accelerator, in order to increase the rate of crystallization of glass fibers when subjected to heat.

SUMMARY OF THE INVENTION

The invention contemplates the treating of miner wool fibers with lithium carbonate to form a sag-resistant ceiling panel. The lithium carbonate may be applied by any convenient method such as wet or dry spraying of lithium carbonate during fiber formation, direct addition of lithium carbonate to the ceiling board formulation, post application to the board by sprinkling, saturation, or spraying, and direct addition of lithium carbonate to the melt prior to the formation of the mineral wool fibers. The ceiling panel itself will be made by conventional methods as by dry-laying, or wet-laying. These ceiling panels will more often than not use a binder system which may be a curable phenolic resin system or a starch solution. The lithium carbonate may be conveniently incorporated in the binder system if one is used. The finished panel will have a decorative surface to present to the interior of the room, and it will be cut to any of various suitable sizes and shapes for room installation.

BRIEF DESCRIPTION OF THE DRAWING

The FIGURE shows a cross section of the product of the present invention.

DETAILED DESCRIPTION OF INVENTION

The Physics of the Process

Mineral wool is a glassy, amorphous, fibrous material that changes to a crystalline material above about 800° C. (1472° F.). This change from an amorphous material to a crystalline material is known as devitrification. Once the crystalline state in mineral wool fibers has been achieved, the processes of softening, deformation, and shrinkage are slowed or stopped, since the crystalline state has a significantly higher melting point. However, with mineral wool, major shrinkage takes place prior to the time at which devitrification—and thus greater stability—occurs. It is possible to devitrify mineral wool by subjecting them to a carefully controlled heat history akin to annealing. In this way, the glassy amorphous fiber can be converted to a crystalline fiber without significant shrinkage. However, such heat treating processes are time- and energy-consuming and thus expensive. They often render the fiber unusable. The discovery of the present invention is that lithium carbonate in the proper amount and reasonably uniformly distributed on or through the mineral wool fibers controls the rate of devitrification so that the mineral wool fibers do not normally shrink when exposed to the conditions normally encountered in a fire in a room. The presence of a binder maintains the physical integrity of the panel as it is being formed and in its use as an acoustical ceiling panel under the various conditions that exist in a room.

Details of the Process and Product

As mentioned earlier, the ceiling panel will be formed by conventional processes, and the lithium carbonate can be introduced in any convenient manner. The mineral wool as received will be fluffed to form a loose mass of individual fibers. While the binder system may be introduced by sprinkling or otherwise adding dry powders to the mass of the fluffed mineral wool fibers, it is preferred that the fibers first be picked up in a conveying air stream and the binder system and the lithium carbonate introduced separately into the air stream. The air stream will then convey the mineral fibers and the rest of the system to a board-forming chamber, thoroughly mixing the mineral wool fibers and other ingredients during the conveying process. The board-forming chamber may consist of two endless forming wires with means for allowing the air to escape through the wires. The forming wires may converge at a nip spaced to produce a mat of the desired thickness. After leaving the board-forming portion of the operation, the mat is conveyed to a mold in which the mat will be modestly compressed. Heat will be applied if the binder system comprises a curable phenolic resin. The heat may be conveyed throughout the mat simply by passing heated air through the mat. For a common curable phenolic resin binder system, temperatures obtained throughout the mat will run about 400°–450° F. (205° F.–232° C.). The density of the resulting ceiling panel will normally be in the range of about 6 to 9 pounds per cubic foot. For decorative purposes, the panel may be painted or coated to present an attractive appearance on the ceiling of a room.

The amount of lithium carbonate to be applied to the mineral wool fibers will vary from about 1% to about 6% by weight lithium carbonate based on the weight of the mineral wool fibers. Amounts above these amounts constitute an excess and a waste of material. By the time the amount of lithium carbonate approaches 16% by weight based on the weight of mineral wool fibers, the effect reverses and the mineral wool fibers will actually flow and shrink at a temperature lower than that of untreated mineral wool fibers. The devitrification action of lithium carbonate on mineral wool fibers is surprisingly specific. For instance, any amount of lithium carbonate on perlite, a glassy alumina silicate, or on the glass fibers used in making thermal insulation batts, borosilicates, acts as a flux which reduces the fusion and melting temperature along with the consequent earlier shrinkage.

For unknown reasons, the addition of lithium carbonate in the form of an aqueous slurry does not appear to be as effective as addition in the dry form. Accordingly, larger amounts of lithium carbonate within the ranges stated should be used when a wet slurry is added.

Technical grade lithium carbonate, $Li_2CO_3$, is an item of commerce. While the smaller the lithium carbonate particles, the more effective its effect when applied as a dry powder or as a slurry, the standard grades having the following sieve analysis are perfectly acceptable:

| U.S. Mesh | Typical Analysis % Passing |
| --- | --- |
| 40 | 100 |
| 100 | 85 |
| 200 | 45 |

Lithium carbonate in the form of lithium oxide has been used for many years as a component of quality glasses, glazes, and enamels. It imparts the properties of chemical resistance, low-thermal expansion and high gloss. In these applications, the lithium oxide is actually used for its fluxing action in order to reduce firing temperature and time, to improve flow and bonding properties and to commit enameling of thinner sheet steel. The purity of technical grade lithium carbonate is typically 99.1%, with about 0.5% $H_2O$ being the principle impurity.

As an embodiment of the present invention, lithium carbonate may be added to the pre-melt from which mineral wool fibers are to be spun. At some point during the formation of the melt, the lithium carbonate converts to lithium oxide. Whether or not the oxide reacts with any of the other oxides present in the mineral wool is not known. The fibers formed from such a melt behave when subjected to an elevated heat history as if lithium carbonate had been present on the mineral wool fibers in discrete particles as in the preferred embodiment.

EXAMPLE 1

Blends of mineral wool containing 2% by weight lithium carbonate based on the weight of the mineral wool were prepared, along with suitable controls containing no lithium carbonate. Samples were placed in an oven maintained at 800° C. for various times. At the end of each suitable time period, the samples were analyzed by X-ray diffraction for crystallinity. The area under the first order reflection peak of the primary crystalline phase was utilized as an indication of the amount of crystallinity.

Following are the results:

| Time | Peak Area, mm² | |
| --- | --- | --- |
| | Control | $Li_2CO_3$ |
| 15 min | — | 226 |
| 30 min | — | 459 |
| 45 min | — | 407* |
| 60 min | — | 406* |

*The amount of this phase has been reduced due to the formation of additional phases.

EXAMPLE 2

Two batches of mineral wool fiber were packed into crucibles for testing in a tube compression apparatus. One sample contained 3% by weight lithium carbonate based on the weight of the mineral wool fibers. Both samples were inserted into a furnace maintained at 1450° F. (800° C.) and heat soaked for 15 minutes. They were then loaded with a 1-pound weight and then the linear shrinkage/compression measured.

Control: deflection off-scale within 1 minute (1,000 mils).

3% lithium carbonate: deflected 47 mils after 16 minutes, no further shrinkage occurred.

These results demonstrate the effect of fiber stiffening on the resistance to deformation.

EXAMPLE 3

Two samples of mineral wool fibers were prepared, one containing 2% by weight lithium carbonate dry-blended with the wool, the other with no additives. Both samples were heat-treated and their crystallinity determined by X-ray diffraction. The main peak area of the test sample was 147 mm² after 24 hours at 680° C. The control showed only 18 mm² after 163 hours at 720° C.

EXAMPLE 4

A mixture or oxides was prepared which simulated the composition of mineral wool with regard to the four major oxides. To one batch was added 3% by weight based on the weight of the oxides of lithium carbonate which corresponds to 1.2% lithium oxide in the glass due to loss of carbon dioxide. The material were melted in platinum crucibles at 2600° F., removed and quenched by pouring into water. The final compositions were:

| Oxide | Control | Test |
| --- | --- | --- |
| $SiO_2$ | 42.4 | 41.9 |
| $Al_2O_3$ | 10.5 | 10.4 |
| CaO | 37.0 | 36.6 |
| MgO | 10.1 | 10.0 |
| $Li_2O$ | — | 1.2 |

These samples were ground to a fine particle size, heated at 900° C. for various times and analyzed for crystallinity by X-ray diffraction. The area of the first order reflection peak was used as an indication of percent crystallinity. Both samples showed the presence of the crystalline phase, akermanite ($2CaO \cdot MgO \cdot 2SiO_2$).

Following are the results:

| Time | Peak Area, mm² | |
| --- | --- | --- |
| | Control | Test |
| 5 min | 0 | 0 |
| 10 min | 0 | 372 |
| 15 min | 20 | 580 |
| 30 min | 22 | 846 |
| 60 min | 216 | 918 |

I claim:

1. A ceiling panel resistant to sag when exposed to a fire in a room comprising mineral wool fibers and reasonably uniformly distributed therein about 1% to about 6% lithium carbonate, or the fused decomposition product thereof, based on the weight of the mineral wool fibers.

2. A panel according to claim 1 containing about 3% by weight lithium carbonate.

3. A panel according to claim 1 having a decorative surface on the side of the panel exposed to the room.

4. A panel according to claim 1 having about 3% lithium carbonate, a phenolic binder system, and a decorative surface on the side of the panel exposed to the room.

5. A panel according to claim 1 containing a binder system for the mineral wool fibers.

6. A panel according to claim 5 in which said binder system is a cured phenolic resin.

* * * * *